June 26, 1951 W. J. HALOSKI 2,558,432

MAGNETIC TAPE RECORDER-REPRODUCER

Filed Aug. 15, 1947 5 Sheets-Sheet 1

INVENTOR
Walter J. Haloski
By Richard C. Lindberg
ATTY.

June 26, 1951 W. J. HALOSKI 2,558,432

MAGNETIC TAPE RECORDER-REPRODUCER

Filed Aug. 15, 1947 5 Sheets-Sheet 2

INVENTOR
Walter J. Haloski

BY Richard C. Lindberg
ATTY.

MAGNETIC TAPE RECORDER-REPRODUCER

Filed Aug. 15, 1947 5 Sheets-Sheet 3

INVENTOR
Walter J. Haloski
By Richard C. Lindberg
ATTY.

June 26, 1951 W. J. HALOSKI 2,558,432

MAGNETIC TAPE RECORDER-REPRODUCER

Filed Aug. 15, 1947 5 Sheets-Sheet 4

Inventor
Walter J. Haloski
By Roland C. Lindberg
Atty.

June 26, 1951 W. J. HALOSKI 2,558,432

MAGNETIC TAPE RECORDER-REPRODUCER

Filed Aug. 15, 1947 5 Sheets-Sheet 5

INVENTOR
Walter J. Haloski
BY Richard C. Lindberg
ATTY.

Patented June 26, 1951

2,558,432

UNITED STATES PATENT OFFICE 2,558,432

MAGNETIC TAPE RECORDER-REPRODUCER

Walter J. Haloski, Chicago, Ill., assignor to Union Specialties Company, Chicago, Ill., a corporation of Illinois Application August 15, 1947, Serial No. 768,806

24 Claims. (Cl. 179—100.2)

This invention relates generally to magnetic recorders and reproducers and has particular reference to magnetic recorder-reproducers employing a flat tape of paramagnetic material or a flat tape coated with a substance containing finely divided paramagnetic material.

Magnetic recorders generally employ reels or spools for storing the record medium, and after recording the record medium is wound on one of the reels. Before reproducing, the record medium must be rewound on to the other reel, and this operation has heretofore entailed the use of complicated gearing or belt arrangements for transferring the power means driving the take-up reel in recording to the pay-off reel in rewinding the record medium. The magnetic recorders or reproducers of the prior art have generally required that the record medium be led from a pay-off reel over or through various guides, past the sound head and driving means for the record medium before being wound on the take-up reel. Such arrangements have been costly, complicated and lacking in speed of operation.

With the foregoing considerations in mind it is a principal object of this invention to provide in a magnetic recorder or reproducer a simple arrangement for moving the record medium past a sound or recording head in recording, which arrangement is also operable in rewinding the record medium without the necessity of complicated and expensive gear mechanisms.

Another object is to provide an arrangement which will simultaneously move the record medium past the sound head in recording at constant speed and which will store the record medium on a take-up reel without the requirement of gearing.

Yet another object is to provide a single motor which will move the record medium at constant speed past the sound head and will store the record medium on a take-up reel, and which can be shifted in position to drive the pay-off reel to rewind the record medium prior to play-back.

Still another object is to provide a single motor to operate the recorder in both recording and rewind prior to play-back, the motor having a center of rotation which moves about a pivot, and the center of rotation being shiftable in position according to whether the device is operated in rewind or record and play-back.

A yet further object is to provide a recorder or reproducer with a sound head and a driving stud mounted on one support, and a record medium guide and a driven member adapted to cooperate with the driving stud all mounted on a support movable with respect to the other support, whereby the record medium may be drawn past the sound head at constant speed between the driving stud and the driven member.

Still another object is to provide an erase head, a sound head and a driving stud all mounted on a single support and enclosed by a housing, a second support for record medium guide means and a driven member, all enclosed by a second housing, the two housings being separated a small distance to receive the record medium, and the second support being subsequently movable within the housing so that the driven member will be engaged by the driving stud with the record medium between, and the record medium drawn past the sound head with constant speed.

Another object is to provide a support for a guide and a driven member, which driven member can be brought into cooperative engagement with a driving stud, the support being provided with a spring biased cam follower which cooperates with a cam to lift the support into driving position, the cam also cooperating with means to connect a driving motor to the driving stud, the same cam operating to permit the stud and driven member to separate and to move the motor to rewind position.

Yet another object is to provide an arrangement which will keep the motor in position of no drive, record or play-back, or rewind, the position of the motor being readily obtained by operating a yoke which will engage the motor and move its center of rotation about a pivot point.

A yet further object is to provide an arrangement which will keep the motor in one of three positions, the position being determined by operation of a yoke which cooperates with the motor, the position being maintained by means of a detent against which the yoke must work in changing from one position of the motor to another position of the motor.

Still another object of the invention is to employ an erase head or a field of high strength for destroying signals upon the record medium prior to the recording thereon at the sound head, the erase head being arranged to control switch means associated with the circuit supplying energy to the motor so that the motor can be operated in play-back or rewind only when the erase head is out of proximity to the record medium.

Another object is to provide means for adjusting the sound or recording head of a tape recorder in such a manner that the gap across which the magnetic flux is centered in recording or play-back is so positioned that optimum recording or reproducing is achieved.

Other objects and important features of the invention will be apparent from a study of the description hereinafter taken together with the drawings, which show a preferred embodiment of the invention, and which show a form which the invention will assume in commercial practice. While the embodiment shown is considered to be a desirable one, the invention is not intended to be limited in terms of the shown embodiment, but only in terms of the claims subjoined.

Figure 1:
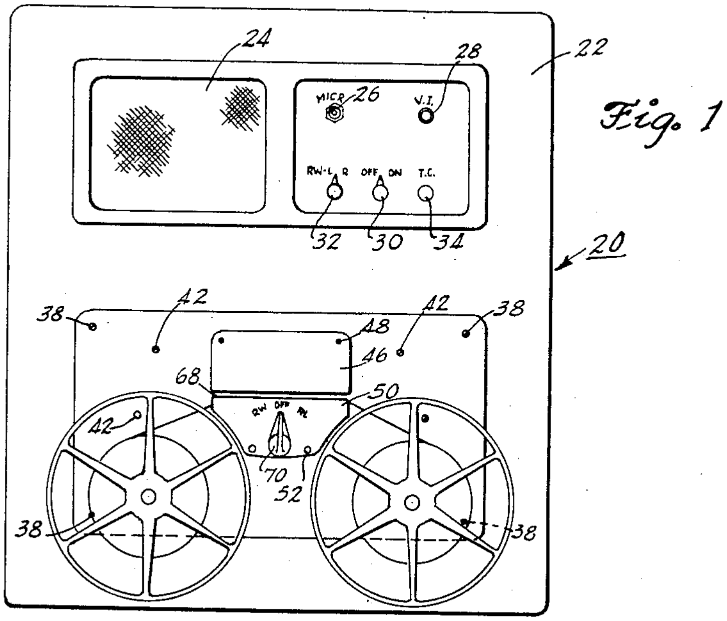
Figure 1 is a front view of a magnetic tape recorder-reproducer according to the present invention.
Figure 14:
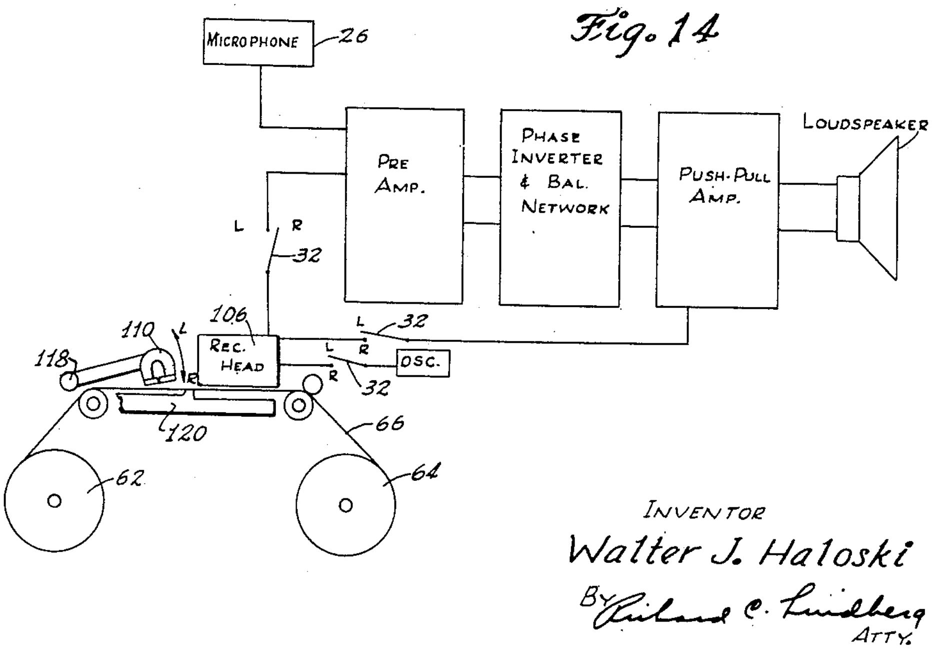
Figure 14 is a schematic diagram illustrating the amplifier system used in connection with the magnetic tape recorder-reproducer of Figures 1 to 13 inclusive.

Referring now to Figure 1 of the drawings, the magnetic recorder-reproducer according to the present invention is indicated generally by the ordinal 20, and is composed in part of a front panel 22 which mounts a speaker grill 24, a jack 26 for a microphone, see also Figure 14, and a volume indicator 28. The upper part of the panel 22 also mounts an on-off switch 30 which controls a supply of energy to the amplifier and oscillator networks shown in Figure 14. The panel 22 also supports a switch 32 controlling various operations of the recorder-reproducer 20, position RW–L being shown for the rewind and listen positions of the switch 32, and position R being shown for record position of the switch 32, see also Figure 14. The front panel 22 may also be provided with a control 34 which controls the tone of the amplifier shown in Figure 14.

Figures 2, 3:
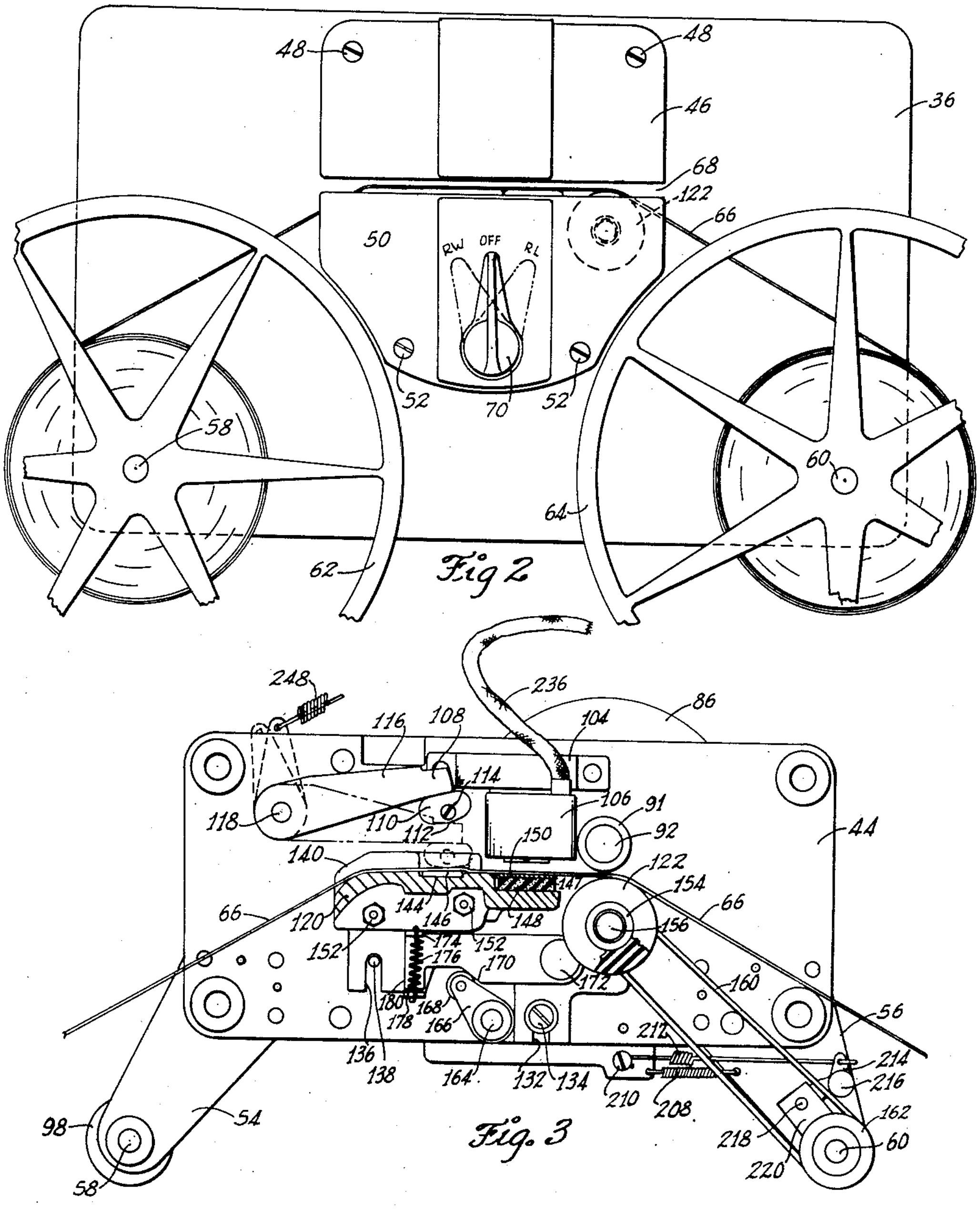
Figure 2 is an enlarged view of the lower part of the front panel shown in Figure 1, showing certain details of the housings concealing the sound head, the erase head and driving mechanism for the record medium.
Figure 3 is an enlarged view of the mechanism behind and within the housings shown in Figure 2.
Figure 10:
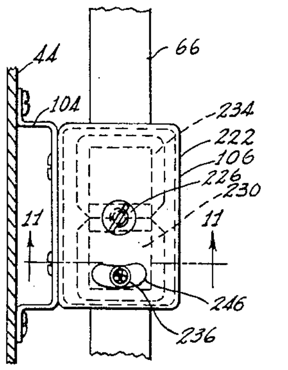
Figure 10 is a top view of the sound head shown in Figure 3.

The lower part of the panel 22 supports a panel 36 which is held to the panel 22 by means of screws 38. The panel 36 in turn supports a driving mechanism indicated generally by the ordinal 40 for the recorder-reproducer 20 at mounting screws 42 passing through the panel 36 and into a fixed support plate 44, see Figures 3, 4, 5, and 8. The driving mechanism 40 is concealed by an upper housing 46 held to the panel 36 by screws 48, and separated therefrom is a lower cover plate 50 held to the panel by means of screws 52. Attached to the fixed support plate 44 as by the rivets shown are a pair of diverging arms 54 and 56, see Figures 3, 4, 5, 8, and 9, which provide supports for shafts 58 and 60 which drive respectively a pay-off reel 62 and a take-up reel 64 which store a record medium 66, which as shown in Figure 10 consists preferably of a non-metallic tape provided with a coating having uniformly dispersed therethrough final divided paramagnetic material, which may be black oxide of iron or finely divided magnet material of the kind composed of aluminum, nickel and cobalt. As shown in Figures 1 and 2 particularly, the housings 46 and 50 are separated a small distance to provide a slot 68 through which the tape 66 may move readily in recording or play-back operation or in the rewind operation.

The lower housing 50 is provided with indicia to show the positions taken by an operator 70 to indicate the stop position, to indicate the operation in rewind as shown by the symbol RW, and to indicate the operation in recording or play-back as indicated by the symbol RL.

Figure 8:
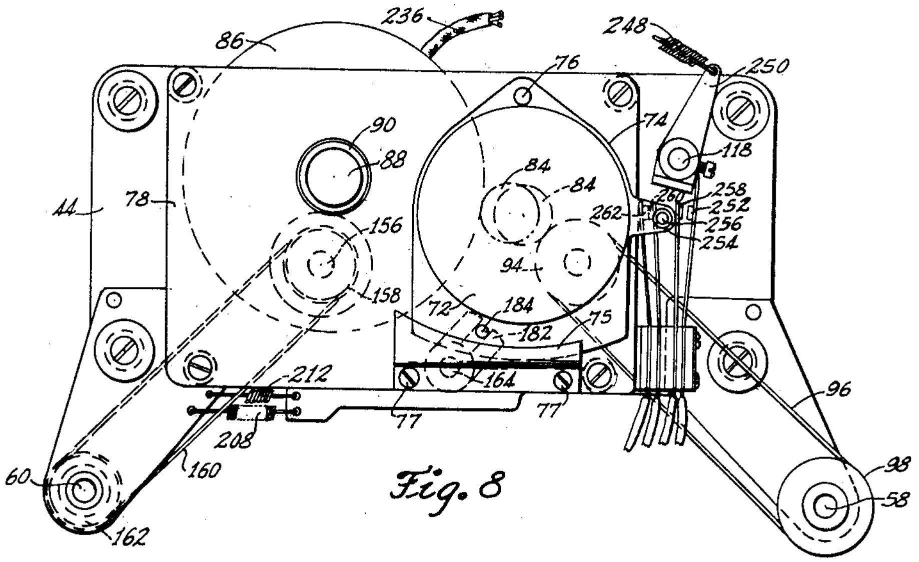
Figure 8 is a rear view of the mechanism shown in Figure 3.

Referring now to Figures 3 to 9 inclusive, the driving mechanism 40 for the recorder-reproducer 20 consists of a motor 72 mounted in a plate 74 which is pivotally connected at 76 to a support plate 78 which is secured to the front support 44 and spaced therefrom by means of members 80. A guide 75 is provided for the lower portions of the motor mounting plate 74 and is held to the support plate 78 by means of machine screws 77. The motor 72 has a shaft 82 which has mounted thereon a rubber driving roller 84 which is at times in engagement with the rim of a flywheel 86 having a journal 88 rotating in a bronze bearing 90 supported on the plate 78 as shown in Figure 8. The flywheel 86 is also journaled in the support plate 44 at 91, the journal being continued past the bearing 91 to provide a feed roller 92, see Figures 3 and 4.

The driving roller 84 is adapted at times, as will be presently described in more detail, to drivably engage a rewind pulley 94 which in turn drives, by means of a belt 96, a pulley 98 which is secured to the rewind on a pay-off shaft 58. Also secured to the pay-off and rewind shaft 58 is a hub 100 having a pin 102 extending therefrom which is adapted to engage a hole formed in the hub of the reel 62 in a manner well known in the art.

The fixed support plate 44 has secured thereto a mounting bracket 104 which supports a sound or recording or play-back head indicated generally by the ordinal 106. The fixed support also supports an erase head indicated generally by the ordinal 108, see Figure 3, which consists of a piece of magnet material 110 formed substantially in the shape of a horseshoe to provide a gap 112 across which the field strength of the magnet 110 is concentrated. The magnet 110 is preferably made of a magnet material giving extremely high field densities and consists of an alloy of aluminum, nickel and cobalt. The magnet 110 is held by a machine screw 114 through an arm 116 fast on a shaft 118 journaled in the front support plate 44.

Means are provided for moving a guide 120 and a pressure roller 122 toward the erase head 108, the sound head 106 and the driving stud 92 with the record medium 66 therebetween whereby upon rotation of the feed roller 92 the record medium 66 will be driven at constant speed past the erase head 108 and the sound head 106 in recording and past the recording head 106 alone in play-back and moved from the pay-off reel 62 and on to the take-up reel 64. To this end, there is provided a substantially T-shaped roller and guide plate 124, see Figure 9, having a leg 126 which is partially guided in its movement to the fixed support plate 44 by means of a slot 128 therein which cooperates with a headed guide pin 130. One arm of the T-shaped member 124 is slotted as at 132 to cooperate with a similar headed pin 134 secured to the fixed support plate 44. The other arm of the T-shaped roller and guide plate 124 is similarly slotted at 136 and guided by means of a similar headed pin 138. It will be apparent that the plate 124 will be correctly aligned in its movement with respect to the fixed support 44 by means of the slots and pins just described.

Figure 4:
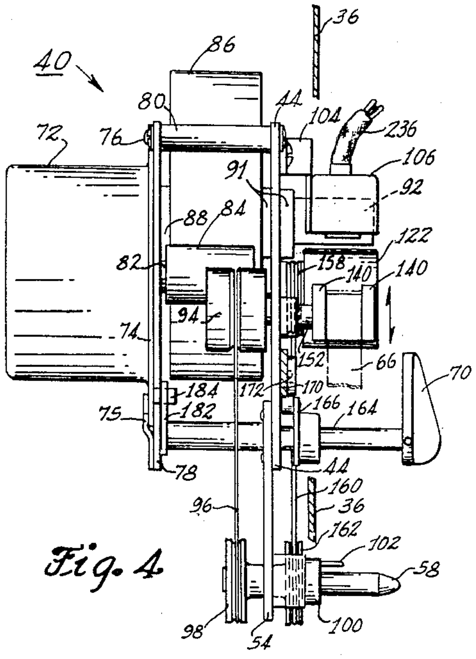
Figure 4 is an end view of Figure 3 looking from the left.
Figures 7, 11:
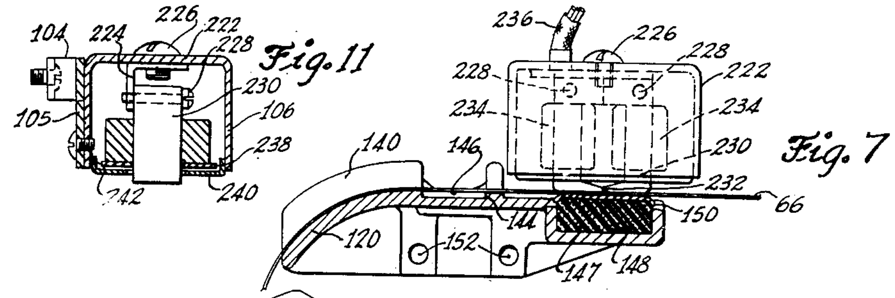
Figure 7 is an enlarged view of the tape guide shown in Figure 3 illustrating how the guide cooperates with the sound head shown in Figure 3.
Figure 11 is a section taken along the lines 11—11 of Figure 10.
Figure 12:
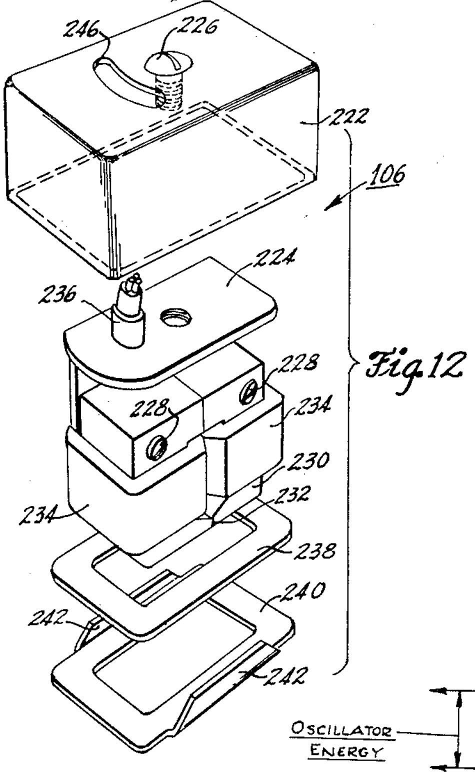
Figure 12 is an exploded isometric view of the sound head shown in Figures 3, 10 and 11.

The guide 120 consists of a shoe molded of thermo-plastic or thermo-setting material and includes a pair of side rails 140, see also Figures 4 and 7, for guiding the tape or record medium 66. The guide 120 is provided with a recess 144 for mounting a piece of sponge rubber 146, which is adapted to lie underneath the magnet 110 when it is in the dotted line position shown in Figure 3. The guide 120 is also provided with a recess 148 for holding a piece of sponge rubber 147 which supports a pressure plate 150 which underlies the sound head 106, and the resiliency of the sponge rubber tending to hold the pressure plate 150 against the record medium 66 against the pole faces of the sound head 106. The guide 120 is held to the T-shaped plate 124 by means of bolts and nuts 152.

The pressure roller 122 which is made of resilient rubber is fast on to a bushing 154 which rotates on a stub shaft 156 which is supported by the T-shaped roller and guide plate 124. Also integral with the bushing 154 is a V-pulley 158 which drives a spring belt 160 which passes over a V-pulley 162 which is fast to the take-up shaft 60 and drives a take-up reel 64 in a manner well known in the art.

Means are provided for moving the T-shaped roller and guide plate 124 supporting the pressure roller 122 and the guide 120 toward the erase head 108, the sound head 106 and the feed roller 92 with the record medium 66 between the side rails 140 of the guide 120 and the pressure roller 122 and the feed roller 92 and the sound head 106, said means simultaneously shifting the center of rotation of the motor 72 so that the rubber driving roller 84 of the motor 72 will engage the rim of the flywheel 86 and thereby impart rotation to the feed roller 92. To this end there is provided a shaft 164 journaled in the fixed support plate 44 and having fast thereto the operator 70, see Figure 2. The shaft 164 has fast thereto a cam 166, see Figure 5, which supports a cam roller 168 adapted at times to be in cooperative engagement with a cam follower 170 pivoted at 172 to the roller and guide plate 124. The follower 170 is provided with an outstanding ear 174 which holds a spring 176, the other end of the spring 176 being secured to a similar outstanding ear 178 formed in the T-shaped roller and guide plate 124. The cam follower 170 is also provided with a downward extension 180 which is adapted at times to engage the outstanding ear 178 and limit the amount of counter clockwise movement of the cam follower 170 with respect to the plate 124. It will be seen that upon rotation of the cam 166 in clockwise direction by means of the operator 70 that the cam follower 170 will be first pivoted about its pivot point 172, and that the spring 176 will be extended a required amount. The pull thus placed in the spring 176 will urge the T-shaped plate 124 upwardly on the guide pins 130, 134, and 138 to move the guide 120 toward the erase magnet 110 and the sound head 106 and the pressure roller 122 toward the feed roller 92.

Figure 9:
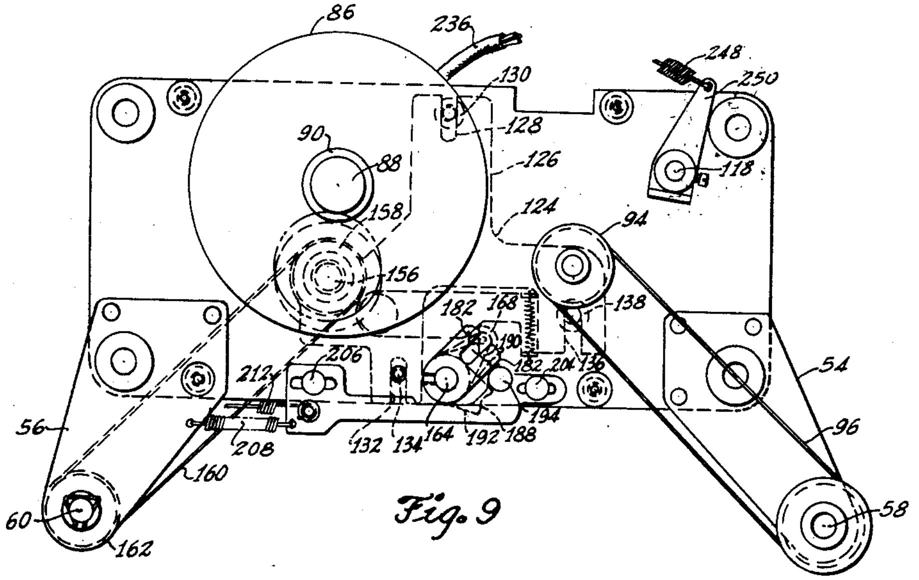
Figure 9 is a view similar to Figure 8 showing certain details of the yoke and detent mechanism shown in Figures 5 and 6.

Means are provided to cooperate with the means for moving the T-shaped plate 124 with the guide 120 and the pressure roller 122 just described and to be actuated by rotation of the shaft 164 to shift the center of rotation of the motor 72 to cause the driving roller 84 to engage the rim of the flywheel 86. To this end the end of the shaft 164, see Figures 4, 6, 8, and 9, is provided with a yoke 182 which engages a pin 184 fastened to the plate 74 and extending therefrom. It will be seen that upon rotation of the shaft 164 in a clockwise direction as viewed in Figures 5 and 6, and counter clockwise as seen in Figures 8 and 9, the yoke 182 will engage the pin 184 and move the center of the motor 72 so that the driving roller 84 thereof is moved against the flywheel 86 to drive the feed roller 92. Since the pressure roller 122 is in contact with the feed roller 92 by this time with the record medium 66 therebetween, the record medium 66 will be moved past the sound head 106 and the erase magnet 110 (in the recording operation only as will be described), and stored on the take-up reel 64, the take-up reel 64 being driven by the pulleys 156 and 162 and the spring belt 160.

The shaft 164 may be rotated in a counter clockwise direction by means of the operator 70 to cause the driving roller 84 of the motor 72 to engage the pulley 94 to operate the recorder-reproducer in rewind after a recording or play-back operation. The operation of the recorder-reproducer in rewind is characterized by extremely high ratio in speed of rewind to the speed of the record medium 66 in recording or play-back. Further, the rotation of the shaft 164 by means of the operator 70 serves to move the roller and guide plate 124 downwardly whereby the pressure roller 122 is out of engagement with the feed roller 92, and the guide 120 is out of proximity to the sound head 106 and the erase head 108, thereby permitting the record medium to be rewound upon the pay-off reel 62 with extreme rapidity and without being subjected to any pulling strains.

Figures 5, 6:
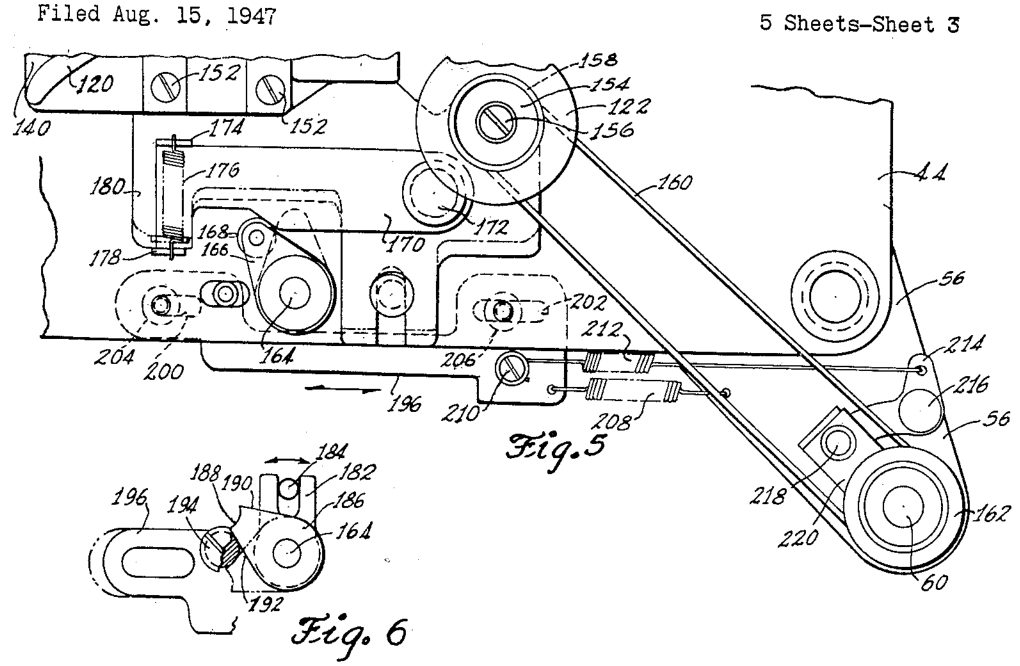
Figure 5 is an enlarged view of a portion of the mechanism shown in Figure 3, showing details of the cam and cam follower mechanism for placing a recorder-reproducer in position for record, stop or play-back positions.
Figure 6 is an enlarged view of a detent mechanism for placing the machine in off, rewind or record and play-back position.

Means are provided for maintaining the rubber driving roller 84 of the motor 72 in one of three definite positions, viz, record or play-back position, whereby the rubber roller 84 is in engagement with the rim of the flywheel 86; whereby the rubber driving roller 84 is in engagement with pulley 94 in the fast rewind operation; or whereby the rubber driving roller 84 is in a position between the record position or the rewind position which is called the off position, and where the rubber driving roller 84 is out of contact with any object during periods when the device is not used. This insures that no permanent set is introduced into the rubber driving roller 84, thereby insuring that the feed roller 92 and the flywheel 86 will be driven at uniform speed without any changes in speed or vibration which might be caused by a flat spot on the rubber driving roller 84. To this end, see particularly Figures 5 and 6, the shaft 164 is provided with a flat detent 186 having an arcuate surface 188 and sides 190 and 192 each of which are adapted at times to engage a headed stud 194 threaded to a plate 196 having slots 200 and 202 therein to permit movement of the plate 196 with respect to the support 44 and to be held by screws 204 and 206 which ride respectively in the slots 200 and 202. It will be seen from the arrangement just described that when the stud 194 is in engagement with the surface 190 of the detent 186, as shown in the dotted line position in Figure 6, that the motor 72 will be in the rewind position, as shown in Figure 8. When the arcuate surface 188 of the detent 186 is in contact with the headed stud 194 the recorder-reproducer 20 will be in the off position as shown by the position of the operator 70 in Figure 2 and the rubber driving roller 84 of the motor 72 will be in the position where it contacts neither the rim of the flywheel 86 nor the pulley 94. When the detent 186 is in the full line position shown in Figure 6 with the stud 194 impinging the surface of the side 192 of the detent 186, the rubber driving roller 84 of the motor 72 will be in engagement with the rim of the flywheel 86, as shown in Figure 8, and the roller and guide plate 124 will be moved upward as is shown in Figure 5, whereby the pressure roller 122 is in driving connection with the feed roller 92.

Means are provided to give resistance to the rotation of the operator 70 and lock the detent 186 mounted on the shaft 164, and to this end the stud 194 is constantly urged to the right by means of a spring 208 which is connected at one end to the plate 196 and to the other end on the arm 56.

In order that the take-up reel 54 will be locked when the operator 70 is in the off position to prevent retrogressive movement of the record medium and to prevent the over-running of the take-up reel 64 with respect to the pay-off reel 62 in rewind, braking means are provided for the pulley 162. As shown in Figures 3 and 5, the plate 196 is connected at 210 to a spring 212 which is in turn connected to a bell crank lever 214 which is pivoted at 216 to the arm 56. The bell crank lever 214 has hingedly connected thereto at 218 a shoe 220 which engages the rim of the pulley 162. When the detent 186 is in the off position as shown in Figures 2 and 5, the spring 212 will have a greater amount of tension in it and thus place a greater moment on the bell crank 214 to give more pressure of the shoe 220 against the rim of the pulley 162 than when the operator 70 is in either the RW or RL position as shown in Figure 2 and the stud 194 impinges against surface 190 or 192 of the detent 186, in which case a lesser amount of tension is placed in the spring 212 with a consequent lesser moment on the bell crank 214, whereby the brake shoe 220 will place only sufficient drag on the pulley 162 and the take-up reel 64 to prevent the overrunning thereof.

Figure 15:
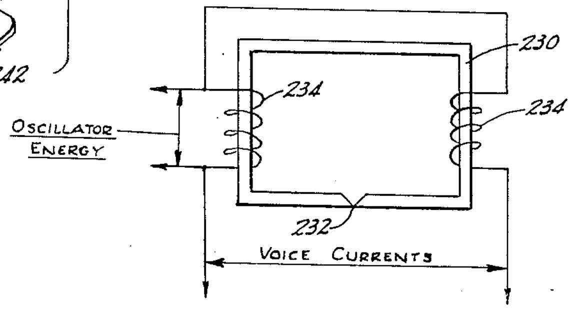
Figure 15 is a schematic diagram showing how the sound head is connected to audio currents and the oscillator for biasing the record medium.

Referring now to Figures 3, 7, 10, 11, 12, and 15, the sound or recording and pick-up head 106 is secured to the bracket 104 which has a downwardly extending leg 105 to which is attached a recording head shield housing 222 which is substantially cubical in shape. The head shield housing 222 supports a mounting bracket 224 made of non-magnetic material by means of an adjusting screw 226. Attached to the mounting bracket 224 by means of bolts 228 is a lamination stack 230 substantially rectangular in shape, each lamination of the stack 230 having a gap 232 therein at a point of minimum cross-sectional area for concentrating the flux induced in the lamination stack by coils 234 surrounding opposite legs of the lamination stack 230. As shown in Figure 15 the coils 234 are connected in series across a line carrying voice currents from the amplifier shown in Figure 14 as will be described in more detail later. One of the coils 234 is connected in series with a source of energy provided by an oscillator also shown in Figure 14, which provides a biasing flux in the recording head 106 during recording. As shown with particular reference to Figures 7 and 12, the leads to the coils structures 234 are contained within a shielded cable 236. The assembly of the head is completed by a Bakelite washer 238 which fits around the lamination stack 230, and a bottom shield 240 of magnetic material which is press fitted into the head shield housing 222 by means of ears 242 which press against the inside of the head shield housing 222.

In order to provide proper orientation of the recording head 106 to the run of the tape or record medium 66 to attain optimum recording and play-back, the top of the shield housing 222 is provided with an arcuate slot 246. By loosening the screw 226 and by adjusting the position of the shielded cable 236 the entire assembly inside the housing 222 may be adjusted so that the gap 232 is properly positioned with the run of the tape 66. The assembly may then be locked in position by tightening the screw 226.

In order to provide a simple means whereby the erase magnet 110 is removed from proximity to the record medium in the play-back operation and also from proximity to the record medium during the rewind operation, a simple interlocking means is provided which will prevent energization of the motor 72 until the erase magnet 110 is removed from proximity to the record medium 66. As shown with particular reference to Figures 1, 8, and 13, the switch 32 is connected to a push-pull cable 248 which is connected to a member 250 fast on the shaft 118 which supports the erase arm 116, see Figure 3. When the switch 32 of Figure 1 is moved to the R position the member 250 will be rocked with the shaft 118 in a counter clockwise direction, as seen in Figure 8, at the same time moving the erase magnet 108 on the arm 116 to the dotted line position shown in Figure 3. In so doing the member 250 rocks a switch point and arm 252 a small amount to the right. Mounted on an extension 254 of the motor support plate 74 is an actuator 256 which is adapted to engage a switch point and arm 258. However, when the operator 70 of Figures 1 and 2 is moved to the RW position to effect rewind, the rubber driving roller of the motor 72 will be in contact with the rewind pulley 94, but the actuator 256 cannot move a sufficient distance to the right to close the circuit to the motor, see also Figure 13, at which time a parallel circuit to the motor 72 through switch points and arms 260 and 262 will be open, since the actuator 256 will move away from the switch point and arm 260.

It will be seen, of course, that with the switch 32 in the record position R and with the operator 70 in the position RL that the driving roller 84 of the motor 74, see Figure 8, will engage the rim of the fly wheel 86, and that the switch contact points and arms 260 and 262 will be in contact since they are together by the actuator 256, and the circuit to the motor 72 will be completed.

In rewinding, with the switch 32 moved to the RW–L position the push-pull cable 248 will rock the arm 250 clockwise to lift the erase magnet 110 from proximity to the guide 120, see Figure 3, and in so doing the switch arm and contact 252 will move a small amount to the left. With the operator 70 of Figure 1 moved to the RW position, the driving roller 84 of the motor 72 will be moved to engage the rewind pulley 94 by means of the yoke 182. In so doing, the actuator 256 will be moved to the right thus opening the circuit between the switch arms and contacts 260 and 262 and then closing the circuit between the switch arms 252 and 258, thereby closing the circuit to the motor and causing the record medium 66 to be moved from the take-up reel 64 to the pay-off reel 62.

In play-back the interlock thus far described also functions to keep the erase magnet 110 from proximity to the record medium 66 as it moves past the sound head 106. With the switch 32 moved to the RW–L position the erase magnet 110 will be moved to the solid line position shown in Figure 3. With the operator 70 moved to the RL position shown in Figure 2, the yoke 182, see Figure 8, will be rocked to the left to move the driving roller 84 into contact with the rim of the flywheel 86, at the same time the actuator 256 moving the switch arm and point 260 into contact with the switch arm and point 262 thus closing circuit to the motor 72. Simultaneous with this operation, of course, the pressure roller 122 is moved into contact with the feed roller 92 with the record medium 66 therebetween so that the record medium will be drawn past the sound head 106 with the erase magnet 110 out of proximity to the record medium 66 that the signals may be picked up by the sound head 106 and subsequently amplified.

Figure 13:
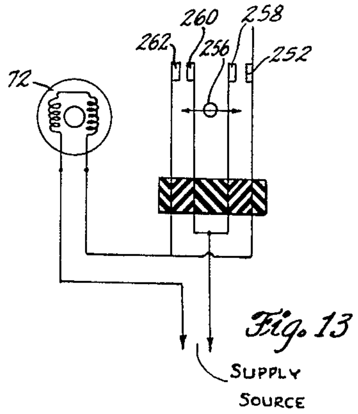
Figure 13 is a schematic diagram showing the control circuit for the motor shown in Figures 4 and 8.

When the operator 70 is moved to the stop position shown in Figure 1, the actuator 256 will occupy a position whereby the circuit to the motor 72 is open through both branches, see Figure 13. Thus, operation in rewind or record or listen may be ceased upon movement of the operator 70 to the stop position shown in Figure 1 without regard to the condition of the switch 32 also shown in Figure 1.

Referring now particularly to Figure 14 of the drawings, in recording the sound or recording head 106 is connected to an amplifier network consisting of a pre-amplifier stage, a phase inverter and balancing network and a push-pull amplifier. Voltages developed in a microphone, connected to a jack 26, see Figure 1, are amplified by the amplifier network just described, and the amplified signal emanating from the push-pull amplifier is impressed at the sound head 106 and through the switch 32 which is in the R position of Figure 1, the switch 32 being moved to the R position as shown in Figure 14. Also connected to the recording head in recording is the output from the oscillator shown, which is connected in parallel with the signals from the output stage of the output of the push-pull amplifier as shown in Figure 15. When it is desired to reproduce signals which have been impressed on the record medium 66, the switch 32 must be in the RW–L position shown in Figures 1 and 14, and the voltages developed in the coils 234 of the recording head 106 are amplified in the amplifier network shown in Figure 14 and converted into sound energy at the loudspeaker shown in Figure 14.

In operation, the pay-off reel 62 and the take-up reel 64 are positioned respectively on their shafts 58 and 60, and the tape or record medium 66 is placed in the slot 68 between the upper housing 46 and the lower housing 50, see Figures 1 and 2. The tape then lies between the side rails of the guide 120 and across the pressure roller 122. When it is desired to record sound on the record medium 66 the switch 30 is moved to the on position which energizes the amplifier network and the oscillator of Figure 14. The switch 32 is then moved to the R position and the operator 70 is moved to the RL position. This energizes the motor 72 and moves the rubber driving roller 84 thereof into engagement with the rim of the flywheel 86 thereby rotating the feed roller 92. Simultaneously the roller and guide plate 124 is raised by means of the cam 166 which moves the pressure roller 122 into engagement with the feed roller 92 to move the tape 66 past the erase head 108 across the gap 112 of which is concentrated an erasing flux which removes any previously recorded signal from the tape 66 before new signals are impressed or recorded thereon at the sound head 106. During this operation voice or other signals will be picked up by the microphone at the jack 26 and amplified in the amplifier network of Figure 14 before being fed through the sound head 106 and recorded on the tape 66.

When it is desired to play back the signals recorded on the tape 66 the tape must be first rewound from the take-up reel 64 and on to the pay-off reel 62. In so doing the operator 70 is moved to the RW position thereby permitting the roller and guide plate 124 to move downwardly to provide free and unimpeded movement of the tape 66 from reel 64 to reel 62, all the while the tape 66 being retained behind the cover plate or housing 50. In this operation the switch 32 is moved to the RW–L position, and the motor 72 will be energized and drive the rewind pulley 94 and in turn the rewind shaft 58. In this operation the erase head 108 is rocked by the shaft 118 out of proximity to the record medium 66 so that the magnetic flux surrounding the erase magnet 110 will not affect any signal on the tape 66.

When it is desired to play back the sound or signals which have been recorded on the tape 66 and following the rewind operation just described, the switch 32 is maintained in the RW–L position, and the operator 70 turned from the RW position in Figure 1 to the RL position of Figure 1. This operation once more raises the roller and guide plate 124 so that the tape 66 is moved past the sound head 106, being driven by the feed roller 92 and between the feed roller 92 and the pressure roller 122, all the while the erase head 108 being maintained in the full line position shown in Figure 3. In this condition of operation, the driving roller 84 of the motor 72 is in contact with the rim of the flywheel 86. In this condition of operation the circuit shown in Figure 14 is so connected to the various switch elements bearing the ordinal 32 that the sound head 106 is connected to the input of the amplified network of Figure 14, and so that the output of the amplifier is connected to the transducer or loudspeaker shown.

The magnetic recorder-reproducer according to the present invention, which preferably employs a non-metallic tape such as paper having a paramagnetic coating thereon, is characterized by extreme simplicity of operation and extremely inexpensive parts making up the entire assembly. Almost without exception the parts can be either stamped or molded, and parts which are not stamped or molded are simple parts which may be turned out by automatic screw machines. The invention is also characterized in its practice by the absence by complicated and expensive gear trains or by complicated and expensive mechanisms for changing the directions of rotation of drive motors in record or rewind. Further, the invention described herein employs a simple shaded pole motor whose center of rotation may be shifted to operate the recorder-reproducer in record and listen or rewind with the motor rotating in one direction only.

While the invention has been described in terms of a preferred embodiment thereof, which embodiment is a commercial one, a scope of the invention is not intended to be limited in terms of the embodiment shown nor otherwise by the scope of the claims here appended.

I claim:

1. In a magnetic recorder-reproducer, a pair of reels for storing a record medium, a sound head and an amplifier, a switch for connecting said sound head to the output of said amplifier in recording and to the input of said amplifier in play-back, a shiftable drive motor driving one of said reels in rewind in one shifted position of said drive motor and the other of said reels in recording or play-back in a second shifted position of said drive motor, means for shifting the center of rotation of said motor for either driving condition, a supply circuit for said drive motor, a switch in circuit with said supply circuit, and means associated with the first switch for opening said second named switch in circuit with said motor when the sound head is connected to the output of the said amplifier, and the drive motor is in the first shifted position to drive the said one reel in rewind.

2. In a magnetic recorder-reproducer, a pair of reels for storing a record medium, a sound head and an amplifier, a switch for connecting said sound head to the output of said amplifier in recording and to the input of said amplifier in play-back, means providing a magnetic field of sufficient intensity to destroy signals recorded on said record medium, associated with said switch means for moving said field into proximity with the record medium in recording for conditioning the record medium and for removing the field from proximity to said record medium in play-back or rewind, a shiftable drive motor driving one of said reels in rewind in one shifted position of said drive motor and the other of said reels in recording or play-back in a second shifted position of said drive motor, means for shifting the center of rotation of said drive motor for either driving condition, a supply circuit for said drive motor, a switch in circuit with said supply circuit, and associated with the first said switch means for opening the said second named switch in circuit with said drive motor when the said magnetic field is in proximity to the record medium and the drive motor is in position to drive the said other reel in rewind for preventing the erasing of signals upon said record medium in rewinding of said record medium.

3. In a magnetic recorder-reproducer of the type employing an elongated paramagnetic record medium, an erase head, a sound head and a feed roller for said paramagnetic record medium all mounted on a common support, a record medium guide and a pressure roller adapted to cooperate with said feed roller, said guide and pressure roller being mounted on a common support movable relative to the said first support, said supports defining a slot for threading said paramagnetic record medium between said feed roller and said pressure roller, and means for effecting movement of the second support toward the first support whereby the paramagnetic record medium may be moved at constant speed between the feed roller and the pressure roller between the erase head and the guide and past said sound head.

4. In a magnetic recorder-reproducer of the type employing an elongated paramagnetic record medium for movement past a sound head in recording and playback, a drive motor for said elongated paramagnetic record medium, a feed roller driven by said motor in recording or playback, a support for a paramagnetic record medium guide and a pressure roller mounted on said support, and means for moving the support to place the pressure roller into engagement with said feed roller with the paramagnetic record medium engaged therebetween, to move said paramagnetic record medium at constant speed past said sound head, said means comprising a cam and a cam follower connected to said support, said cam follower being spring biased in a direction to urge the movement of said support toward engagement of the pressure roller with the said feed roller upon movement of said cam follower on said cam, and means cooperating with said cam and operable to shift the center of rotation of said drive motor to drive said feed roller to move the paramagnetic record medium between said feed roller and said pressure roller.

5. In a magnetic recorder-reproducer of the type employing an elongated paramagnetic record medium for movement past a sound head in recording or playback, a drive motor for said paramagnetic record medium, a feed roller driven by said motor in recording or play-back, a support for a paramagnetic record medium guide and a pressure roller mounted on said support, and means for moving the support with the guide and the pressure roller to place the pressure roller into engagement with said feed roller with the paramagnetic record medium engaged therebetween to move said paramagnetic record medium past said sound head at constant speed, said means comprising a cam and a cam follower connected to said support, said cam follower being movable with respect to said support and provided with a spring connected to said support and tending to urge the support in a direction for engagement of the pressure roller with the said feed roller upon movement of the cam follower on said cam, and means cooperating with said cam and operable to shift the center of rotation of said drive motor in another direction to move the paramagnetic record medium in an opposite direction in rewind thereof.

6. In a magnetic recorder-reproducer of the type employing an elongated paramagnetic record medium for movement past a sound head in recording and playback, a drive motor for said elongated paramagnetic record medium, a feed roller driven by said drive motor in recording or play-back, a support for a paramagnetic record medium guide and a pressure roller mounted on said support, and means for moving the support with the guide and the pressure roller to place the pressure roller into engagement with said feed roller with the paramagnetic record medium engaged therebetween to move said paramagnetic record medium past said sound head at constant speed, said means comprising a cam and a cam follower mounted on said support, said cam follower being spring biased in a direction to urge the movement of said support toward engagement of the pressure roller with the said feed roller, and means cooperating with said means and operable to shift the center of rotation of said drive motor to drive said feed roller, and said second named means being also operable to shift the center of rotation of said drive motor in another direction to move the record medium in an opposite direction in rewind thereof.

7. The invention as defined in claim 5 wherein the first said means is operable to provide for movement of said support away from said feed roller and said sound head to define a slot for the free movement of said paramagnetic record medium in rewind.

8. The invention as defined in claim 6 wherein the first said means is operable to provide for movement of said support away from said feed roller and said sound head to define a slot for the free movement of said record medium in rewind.

9. In a magnetic recorder-reproducer of the type having a pair of reels for storing a paramagnetic record medium and a sound head for deriving signals from and for impressing signals upon said paramagnetic record medium: a motor including a driving shaft and driving roller having a center movable in an arcuate path, a feed roller and a pressure roller for holding said paramagnetic record medium therebetween to move said paramagnetic record medium at constant speed past said sound head on to one of said reels in recording or playback, means for shifting said motor with said driving shaft and driving roller into a first position to drive said feed roller in recording or playback, said means being also operable to shift said motor with said driving shaft and driving roller into a second position to move said paramagnetic record medium in an opposite direction on to the other of said reels in rewind.

10. In a magnetic recorder-reproducer of the type having a pair of reels for storing a paramagnetic record medium and a sound head for deriving signals from and for impressing signals upon said paramagnetic record medium: a motor including a driving shaft and driving roller having a center movable in an arcuate path, a feed roller and a pressure roller for holding said paramagnetic record medium therebetween to move said paramagnetic record medium at constant speed past said sound head on to one of said reels in recording or playback, means for shifting said motor with said driving shaft and driving roller into a first position to drive said feed roller in recording or playback, said means being also operable to shift said motor with said driving shaft and driving roller into a second position to move said paramagnetic record medium in an opposite direction on to the other of said reels in rewind, and means for releasing the engagement of said pressure roller with said feed roller when said motor and said driving shaft and driving roller are shifted to the second position whereby said paramagnetic record medium is moved freely to the other of said reels in rewind.

11. In a magnetic recorder-reproducer of the type having a pair of reels for storing a paramagnetic record medium and a sound head for deriving signals from and for impressing signals upon said paramagnetic record medium: a motor including a driving shaft and driving roller having a center movable in an arcuate path, a feed roller and a pressure roller for holding said paramagnetic record medium therebetween to move said paramagnetic record medium at constant speed past said sound head onto one of said reels in recording or playback, means for shifting said motor with said driving shaft and driving roller into a first position to drive said feed roller in recording or playback, a driving connection between said pressure roller and the said one reel to rotate the said one reel to receive said paramagnetic record medium in recording or playback, said means being also operable to shift said motor with said driving shaft and driving roller into a second position to move said paramagnetic record medium in an opposite direction onto the other of said reels in rewind.

12. In a magnetic recorder-reproducer of the type having a pair of reels for storing a paramagnetic record medium and a sound head for deriving signals from and for impressing signals upon said paramagnetic medium: a shiftable drive motor for said reels and said paramagnetic record medium including a driving shaft and a driving roller, a feed roller driven by said driving shaft and said driving roller in one shifted position of said drive motor, means for shifting said drive motor to said position to drive said feed roller, a support for a pressure roller, and a guide for said paramagnetic record medium mounted on said support, and means cooperating with said first means for moving the support with the guide and the pressure roller into position with the paramagnetic record medium engaged between the feed roller and the pressure roller to move the paramagnetic record medium past said sound head at constant speed on to one of said reels in record or playback.

13. In a magnetic recorder-reproducer of the type having a pair of reels for storing a paramagnetic record medium and a sound head for deriving signals from and for impressing signals upon said paramagnetic medium: a shiftable drive motor for said reels and said paramagnetic record medium including a driving shaft and a driving roller, a flywheel and a feed roller concentric therewith adapted to be driven by said driving roller when contacting said flywheel in one shifted position of said drive motor, means for shifting said drive motor to said shifted position to drive said flywheel and said feed roller, a support for a pressure roller, and a guide for said paramagnetic record medium mounted on said support, and means for moving the support with the guide and the pressure roller towards said feed roller for engagement of the paramagnetic record medium between said feed roller and said pressure roller to move said paramagnetic record medium at constant speed past said sound head in recording or playback.

14. The invention as defined in claim 13 wherein the pressure roller drives one of said reels in recording or playback to store the paramagnetic record medium moved by said feed roller and said pressure roller.

15. In a magnetic recorder-reproducer of the type having a pair of reels for storing a paramagnetic record medium and a sound head for deriving signals from and for impressing signals upon said paramagnetic record medium: a shiftable drive motor for said reels and said paramagnetic record medium including a driving roller driven by said motor, a feed roller driven from said driving roller in recording or playback, a support for a pressure roller and a guide for said paramagnetic record medium mounted on said support, means for shifting the position of said drive motor to drive said feed roller in recording or playback, and means for moving the support with the guide and the pressure roller into position with the paramagnetic record medium engaged between the feed roller and the pressure roller to move the paramagnetic record medium past said sound head at constant speed on to one of said reels in recording or playback.

16. In a magnetic recorder-reproducer of the type employing an elongated paramagnetic record medium for movement past a sound head in recording and playback, a drive motor for said elongated paramagnetic record medium, a feed roller driven by said motor in recording or playback, a support, a pressure roller mounted on said support, and means for moving said support with said pressure roller to place the pressure roller into engagement with said feed roller with the paramagnetic record medium engaged therebetween, to move said paramagnetic record medium at constant speed past said sound head, said means comprising a cam and a cam follower connected to said support, said cam follower being spring biased in a direction to urge the movement of said support toward engagement of the pressure roller with the said feed roller upon movement of said cam follower on said cam, and means cooperating with said cam and operable to shift the center of rotation of said drive motor to drive said feed roller to move the paramagnetic record medium between said feed roller and said pressure roller.

17. In a magnetic recorder-reproducer of the type employing an elongated paramagnetic record medium for movement past a sound head in recording and playback, a drive motor for said elongated paramagnetic record medium, a feed roller driven by said motor in recording or playback, a support, a pressure roller mounted on said support, and means for moving said support with said pressure roller to place the pressure roller into engagement with said feed roller with the paramagnetic record medium engaged therebetween, to move said paramagnetic record medium at constant speed past said sound head, said means comprising a cam and a cam follower connected to said support, said cam follower being movable with respect to said support and provided with a spring connected to said support and tending to urge the support in a direction for engagement of the pressure roller with the said feed roller upon movement of the cam follower on said cam, and means cooperating with said cam and operable to shift the center of rotation of said drive motor in another direction to move the paramagnetic record medium in an opposite direction in rewind thereof.

18. In a magnetic recorder-reproducer of the type employing an elongated paramagnetic record medium for movement past a sound head in recording and playback, a drive motor for said elongated paramagnetic record medium, a feed roller driven by said drive motor in recording or playback, a support, a pressure roller mounted on said support, and means for moving said support with said pressure roller to place the pressure roller into engagement with said feed roller with the paramagnetic record medium engaged therebetween, to move said paramagnetic record medium at constant speed past said sound head, said means comprising a cam and a cam follower mounted to said support, said cam follower being spring biased in a direction to urge the movement of said support toward engagement of the pressure roller with the said feed roller, and means cooperating with said means and operable to shift the center of rotation of said drive motor to drive said feed roller, and said second named means being also operable to shift the center of rotation of said drive motor in another direction to move the record medium in an opposite direction in rewind thereof.

19. The invention as defined in claim 17 wherein the first said means is operable to provide for movement of said support away from said feed roller to define a slot for the free movement of said paramagnetic record medium in rewind.

20. The invention as defined in claim 19 wherein the first said means is operable to provide for movement of said support away from said feed roller to define a slot for the free movement of said record medium in rewind.

21. In a magnetic recorder-reproducer of the type having a pair of reels for storing a paramagnetic record medium and a sound head for deriving signals from and for impressing signals upon said paramagnetic record medium, a shiftable drive motor for said reels and said paramagnetic record medium including a driving shaft, a feed roller driven by said driving shaft in one shifted position of said drive motor, means for shifting said drive motor to said position to drive said feed roller, a support for a pressure roller, and means cooperating with said first means for moving said support and said pressure roller into position with the paramagnetic record medium engaged between said feed roller and said pressure roller to move the paramagnetic record medium past said sound head at constant speed on to one of said reels in record or playback.

22. In a magnetic recorder-reproducer of the type having a pair of reels for storing a paramagnetic record medium and a sound head for deriving signals from and for impressing signals upon said paramagnetic record medium, a shiftable drive motor for said reels and said paramagnetic record medium including a driving shaft and a driving roller, a flywheel and a feed roller driven by said driving roller when contacting said flywheel in one shifted position of said drive motor, means for shifting said drive motor to said shifted position to drive said flywheel and said feed roller, a support for a pressure roller, and means for moving said support with the pressure roller towards said feed roller for engagement of the paramagnetic record medium between said feed roller and said pressure roller to move said paramagnetic record medium at constant speed past said sound head in recording or playback.

23. The invention as defined in claim 22 wherein the pressure roller drives one of said reels in recording or playback to store the paramagnetic record medium moved by said feed roller and said pressure roller.

24. In a magnetic recorder-reproducer of the type having a pair of reels for storing a paramagnetic record medium and a sound head for deriving signals from and for impressing signals upon said paramagnetic record medium, a shiftable drive motor for said reels and said paramagnetic record medium including a driving roller driven by said motor, a feed roller driven from said driving roller in recording or playback, a support for a pressure roller, means for shifting the position of said drive motor to drive said feed roller in recording or playback, and means for moving the support and pressure roller into position with the paramagnetic record medium engaged between the feed roller and the pressure roller to move said paramagnetic record medium past said sound head at constant speed on to one of said reels in recording or playback.

WALTER J. HALOSKI.

REFERENCES CITED

The following references are of record in the file of this patent:

UNITED STATES PATENTS

| Number | Name | Date |
|---|---|---|
| 1,886,856 | Warwick | Nov. 8, 1932 |
| 2,069,841 | Massonneau | Feb. 9, 1937 |
| 2,369,017 | Camras | Feb. 6, 1945 |
| 2,418,543 | Camras | Apr. 8, 1947 |
| 2,467,507 | Stone | Apr. 19, 1949 |

FOREIGN PATENTS

| Number | Country | Date |
|---|---|---|
| 467,105 | Great Britain | June 10, 1937 |